(12) United States Patent
Komatsuzaki et al.

(10) Patent No.: US 10,316,221 B2
(45) Date of Patent: Jun. 11, 2019

(54) ADHESIVE TAPE

(71) Applicant: DIC Corporation, Tokyo (JP)

(72) Inventors: Yuki Komatsuzaki, Saitama (JP); Takeshi Iwasaki, Saitama (JP); Hideaki Takei, Saitama (JP)

(73) Assignee: DIC CORPORATION, Tokyo (JP)

(*) Notice: Subject to any disclaimer, the term of this patent is extended or adjusted under 35 U.S.C. 154(b) by 0 days.

(21) Appl. No.: 14/387,155

(22) PCT Filed: Mar. 15, 2013

(86) PCT No.: PCT/JP2013/057487
§ 371 (c)(1),
(2) Date: Sep. 22, 2014

(87) PCT Pub. No.: WO2013/141167
PCT Pub. Date: Sep. 26, 2013

(65) Prior Publication Data
US 2015/0050477 A1 Feb. 19, 2015

(30) Foreign Application Priority Data
Mar. 22, 2012 (JP) .................. 2012-065407

(51) Int. Cl.
C09J 7/26 (2018.01)
C09J 133/08 (2006.01)

(52) U.S. Cl.
CPC .............. *C09J 7/26* (2018.01); *C09J 133/08* (2013.01); *C09J 2203/318* (2013.01);
(Continued)

(58) Field of Classification Search
CPC . C09J 7/02; C09J 7/0289; C09J 133/08; C09J 2203/318; C09J 2423/006;
(Continued)

(56) References Cited

U.S. PATENT DOCUMENTS 3,717,559 A 2/1973 Oyama et al.
4,272,468 A 6/1981 Slocumb
(Continued)

FOREIGN PATENT DOCUMENTS

CN 1017243 B 7/1992
CN 1768097 A 5/2006
(Continued)

OTHER PUBLICATIONS

International Search Report, dated Jun. 18, 2013, which issued during the prosecution of International Patent Application No. PCT/JP2013/057487, which corresponds to the present application.
(Continued)

*Primary Examiner* — Frank J Vineis
*Assistant Examiner* — Michael Zhang
(74) *Attorney, Agent, or Firm* — McDermott Will & Emery LLP

(57) ABSTRACT

An adhesive tape includes a foam base and an adhesive layer disposed on at least one surface of the foam base, in which the foam base has a thickness of 120 µm or less, a 25% compressive strength of 160 MPa or more, and a density of 0.4 g/cm$^3$ or more, and an average bubble diameter in a vertical direction of the foam base is 23 to 50 µm. Even though the adhesive tape has a small thickness, with this adhesive tape, it is possible to realize excellent waterproofness due to good conformability to an adherend, such drop impact resistance that detachment of the adhesive tape and cracking of the foam base at the time of dropping do not easily occur, and such excellent reworkability that a component can be efficiently separated even in the case where a problem occurs.

6 Claims, 3 Drawing Sheets

(52) U.S. Cl.
CPC ...... *C09J 2423/006* (2013.01); *C09J 2433/00* (2013.01); *G02F 2202/28* (2013.01); *Y10T 428/24975* (2015.01); *Y10T 428/249983* (2015.04)

(58) Field of Classification Search
CPC .......... C09J 2433/00; Y10T 428/24975; Y10T 428/249983; G02F 2202/28
USPC ............................................... 428/216, 317.3
See application file for complete search history.

(56) References Cited

U.S. PATENT DOCUMENTS

| | | | |
|---|---|---|---|
| 4,994,485 | A | 2/1991 | Dolman et al. |
| 5,784,054 | A | 7/1998 | Armstrong et al. |
| 6,350,512 | B1 * | 2/2002 | Hurley .......... Y10T 428/249985 427/317.3 |
| 2003/0207114 | A1 | 11/2003 | Atzesdorfer et al. |
| 2005/0031858 | A1 * | 2/2005 | Tachibana .............. C09J 7/0246 428/343 |
| 2005/0209380 | A1 * | 9/2005 | Wada ..................... C09J 133/04 524/270 |
| 2006/0177642 | A1 | 8/2006 | Tateo et al. |
| 2007/0212478 | A1 | 9/2007 | Fukunaga et al. |
| 2008/0003421 | A1 | 1/2008 | Matsumura et al. |
| 2008/0057301 | A1 * | 3/2008 | Tateo ........................ C08J 9/06 428/338 |
| 2009/0163626 | A1 | 6/2009 | Ukei et al. |
| 2010/0028653 | A1 * | 2/2010 | Kobayashi ................ C09J 5/00 428/319.3 |
| 2010/0143685 | A1 | 6/2010 | Nakayama et al. |
| 2010/0249258 | A1 * | 9/2010 | Uno et al. .................... 521/142 |
| 2011/0300361 | A1 | 12/2011 | Nakayama et al. |
| 2012/0164414 | A1 | 6/2012 | Nakayama et al. |
| 2013/0235514 | A1 | 9/2013 | Tateo et al. |
| 2013/0309483 | A1 | 11/2013 | Watanabe et al. |
| 2014/0356615 | A1 | 12/2014 | Komatsuzaki et al. |

FOREIGN PATENT DOCUMENTS

| | | | |
|---|---|---|---|
| CN | 201013648 | Y | 1/2008 |
| CN | 101724355 | A | 6/2010 |
| CN | 101747847 | A | 6/2010 |
| CN | 101857780 | A | 10/2010 |
| CN | 102268230 | A | 12/2011 |
| CN | 104053734 | A | 9/2014 |
| EP | 0234622 | A1 | 9/1987 |
| EP | 1645589 | A1 | 4/2006 |
| JP | H01-174542 | A | 7/1989 |
| JP | 2002-353614 | A | 12/2002 |
| JP | 2004-323842 | A | 11/2004 |
| JP | 2007-194401 | A | 8/2007 |
| JP | 2008-081645 | A | 4/2008 |
| JP | 2009-108314 | A | 5/2009 |
| JP | 2009-241482 | A | 10/2009 |
| JP | 2010-001364 | A | 1/2010 |
| JP | 2010-013648 | A | 1/2010 |
| JP | 2010-155969 | A | 7/2010 |
| JP | 2010-215906 | A | 9/2010 |
| JP | 2010-260880 | A | 11/2010 |
| JP | 2010260880 | A * | 11/2010 |
| JP | 2011-093619 | A | 5/2011 |
| JP | 2011-168727 | A | 9/2011 |
| JP | 2011-252095 | A | 12/2011 |
| JP | 2012-072347 | A | 4/2012 |
| JP | 2012-072393 | A | 4/2012 |
| JP | 2012-152955 | A | 8/2012 |
| JP | 2012-214623 | A | 11/2012 |
| JP | 2012-214626 | A | 11/2012 |
| JP | 2012-214800 | A | 11/2012 |
| JP | 2013-053179 | A | 3/2013 |
| JP | 5517015 | B1 | 6/2014 |
| KR | 20100084505 | A | 7/2010 |
| TW | 201037053 | A | 10/2010 |
| WO | 2005/007731 | A1 | 1/2005 |
| WO | 2009/044690 | A1 | 4/2009 |
| WO | 2013/176031 | A1 | 11/2013 |

OTHER PUBLICATIONS

Third Party Observation, submitted Nov. 19, 2013, which issued during the prosecution of International Patent Application No. PCT/JP2013/057487, which corresponds to the present application.
Non-final Office Action dated Oct. 7, 2015, issued in corresponding U.S. Appl. No. 14/394,047.
Non-final Office Action dated Oct. 26, 2016, issued in corresponding U.S. Appl. No. 14/368,747.
Written Opinion and International Search Report Issued in connection with PCT Application No. PCT/US2009/003235 dated Jan. 20, 2010.
Extended European Search Report and Preliminary Opinion, European Patent Application No. 09762841.6, dated Jul. 22, 2011.
International Search Report, dated Mar. 12, 2013, which issued during the prosecution of PCT/JP2012/083072, which corresponds to the present application.
International Search Report dated Jun. 18, 2013, issued in application No. PCT/JP2013/057487, with English translation.
International Search Report, dated Jul. 16, 2013, which issued during the prosecution of International Application No. PCT/JP2013/060844.
International Search Report dated Jul. 9, 2013, issued in application No. PCT/JP2013/063655.
Third party Observation, submitted Nov. 19, 2013, which issued during the prosecution of International Patent Application No. PCT/JP2013/060844.
Non-final Office Action dated Dec. 24, 2015, issued in corresponding U.S. Appl. No. 14/400,918.
Final Office Action dated Apr. 7, 2016, issued in corresponding U.S. Appl. No. 14/400,918.
Non-final Office Action dated Oct. 5, 2016, issued in corresponding U.S. Appl. No. 14/400,918.
Non-final Office Action dated Aug. 27, 2015, issued in corresponding U.S. Appl. No. 14/368,747.
Final Office Action dated Dec. 18, 2015, issued in corresponding U.S. Appl. No. 14/368,747.
Final Office Action dated Mar. 1, 2017, issued in corresponding U.S. Appl. No. 14/368,747.
Final Office Action dated Jan. 18, 2017, issued in corresponding U.S. Appl. No. 14/394,047.
Non-final Office Action dated Aug. 22, 2016, issued in corresponding U.S. Appl. No. 14/394,047.
Final Office Action dated Feb. 4, 2016, issued in corresponding U.S. Appl. No. 14/394,047.
U.S. Office Action issued in U.S. Appl. No. 14/368,747 dated Feb. 27, 2018, 11 pages.

* cited by examiner

ADHESIVE TAPE

CROSS REFERENCE TO PRIOR APPLICATIONS

This application is a U.S. National Phase application under 35 U.S.C. § 371 of International Application No. PCT/JP2013/057487, filed on Mar. 15, 2013 and claims benefit of priority to Japanese Patent Application No. 2012-065407, filed on Mar. 22, 2012. The International Application was published in Japanese on Sep. 26, 2013 as WO 2013/141167 A1 under PCT Article 21(2). The contents of the above applications are hereby incorporated by reference.

TECHNICAL FIELD

The present invention relates to an adhesive tape that includes a foam base.

BACKGROUND ART

In portable electronic devices such as electronic notebooks, cellular phones, personal handyphone systems (PHS), digital cameras, music players, televisions, notebook personal computers, and game machines, adhesive tapes are used for fixing various members or modules, for example, for bonding a housing to a panel that protects an information display unit such as a liquid crystal display (LCD) or an organic electroluminescence display (OELD). Many of these portable electronic devices are provided with waterproofness. In such portable electronic devices, waterproofness is achieved by using an adhesive tape for fixing members.

For example, adhesive tapes that use a flexible foam as a base are disclosed as adhesive tapes having waterproof performance (refer to PTL 1 and PTL 2). It is disclosed that since these adhesive tapes have small thicknesses and good conformability, the adhesive tapes can be suitably used for providing portable electronic devices with waterproofness.

Regarding recent portable electronic devices such as smartphones, tablet personal computers, notebook personal computers, and game machines, the screen sizes of information display units of such portable electronic devices have been increasing. In addition, since the spaces occupied by such portable electronic devices tend to increase with the realization of higher functionality, a reduction in the thicknesses of adhesive tapes used in the portable electronic devices has been highly desired. There is also a high demand for adhesive tapes that have small widths and that can fix protective panels of information display units or information display device modules for the purpose of improving the degree of freedom of the design of the information display units. In the fixation of such information display units having large screen sizes or panels that protect the information display units using an ultra-thin adhesive tape and in the fixation of protective panels or information display device modules using an adhesive tape having a small width, the adhesive tape becomes easily separated when an impact due to falling or the like is applied. Thus, in addition to suitable conformability to an adherend, an improvement in impact resistance of adhesive tapes has been desired.

Furthermore, since components such as an image display module and a protective panel of portable electronic devices are expensive, there is also a high demand for reworkability. That is, it is also desirable that a fixed component be suitably separated in the case where a problem occurs in a portable electronic device during the fixation of the component or after the production of the device. However, adhesive tapes including foam bases, in particular, adhesive tapes having a small thickness and a small width tend to have low reworkability. Accordingly, an improvement in reworkability of adhesive tapes has also been desired.

PTL 1: Japanese Unexamined Patent Application Publication No. 2010-155969
PTL 2: Japanese Unexamined Patent Application Publication No. 2010-260880

DISCLOSURE OF INVENTION

Technical Problem

An object to be achieved by the present invention is to provide an adhesive tape that has not only good conformability and suitable impact resistance but also excellent reworkability even though the adhesive tape has a small thickness.

Solution to Problem

In the present invention, an adhesive tape includes a foam base and an adhesive layer disposed on at least one surface of the foam base, in which the foam base has a thickness of 120 μm or less, a 25% compressive strength of 160 kPa or more, and a density of 0.4 g/cm$^3$ or more, and an average bubble diameter in a vertical direction of the foam base is 23 to 50 μm. With this adhesive tape, in addition to good conformability to an adherend and excellent impact resistance, suitable reworkability can be realized even though the adhesive tape has a small thickness. The above object was achieved as a result of this finding.

Advantageous Effects of Invention

Since the adhesive tape of the present invention has good conformability to an adherend, the adhesive tape can effectively prevent water and dust from entering from a gap in a close contact portion, and has excellent waterproofness, excellent drip-proofness, and excellent dust resistance. Accordingly, waterproofness, drip-proofness, and dust resistance can be effectively provided even to, for example, portable electronic devices whose thicknesses have been decreasing, in which the space in a housing is strictly limited, and for which it is difficult to provide separate sealing means. Furthermore, even though the adhesive tape has a small thickness, the adhesive tape has excellent impact resistance at the time of falling. Accordingly, even for portable electronic devices whose space is strictly limited, in the fixation of an information display unit having a large screen size or a large protective panel that protects such an information display unit, and in the fixation of a panel or an information display device itself with an adhesive tape having a small width, detachment of the adhesive tape and cracking of the foam base do not easily occur at the time of falling. In addition, since the adhesive tape has excellent reworkability, a component of a portable electronic device can be efficiently separated even if a problem occurs. Thus, the adhesive tape of the present invention can be suitably used in portable electronic devices, such as smartphones, tablet personal computers, notebook personal computers, and game machines whose screen sizes have been increasing and for which a requirement for flexible design is high.

DESCRIPTION OF EMBODIMENTS

Figure 1:
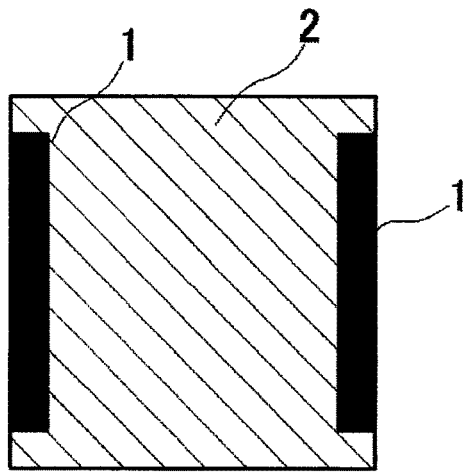
FIG. 1 is a schematic view illustrating a test piece for a surface adhesive strength.

An adhesive tape of the present invention includes a foam base and an adhesive layer disposed on at least one surface of the foam base, in which the foam base has a thickness of 120 μm or less, a 25% compressive strength of 160 kPa or more, and a density of 0.4 g/cm$^3$ or more, and an average bubble diameter in a vertical direction of the foam base is 23 to 50 μm.

[Foam Base]

A foam base used in the present invention has a thickness of 120 μm or less, preferably 50 to 120 μm, and more preferably 80 to 110 μm. When the foam base has the above thickness, a reduction in the thicknesses of portable electronic devices can be realized. Accordingly, the foam base can be suitably used in recent highly-functionalized or multifunctionalized portable electronic devices.

The foam base used in the present invention has a 25% compressive strength of 160 kPa or more, preferably 180 to 500 kPa, and more preferably 180 to 400 kPa. Even though the foam base has a small thickness as described above, good impact resistance and excellent adhesiveness to an adherend can be realized by using a foam base having a 25% compressive strength in the above range.

The 25% compressive strength was measured in accordance with JIS K6767. Samples are prepared by cutting a foam base so as to have a 25 mm square. The samples are stacked until the thickness becomes about 10 mm. The samples are then sandwiched between stainless steel sheets each having an area larger than that of the samples. The samples are compressed by about 2.5 mm (corresponding to 25% of the original thickness) at a rate of 10 mm/min at 23° C. The strength at this time is measured.

The foam base has a density of 0.4 g/cm$^3$ or more, preferably 0.4 to 0.7 g/cm$^3$, more preferably 0.4 to 0.6 g/cm$^3$, and still more preferably 0.4 to 0.5 g/cm$^3$. When the foam base has the above density, even though the foam base has a small thickness as described above, in addition to suitable conformability and adhesiveness, excellent reworkability can be realized. Note that the term "density" refers to an apparent density measured in accordance with JIS K6767. Samples each having a rectangular shape of 4 cm×5 cm are prepared by cutting a foam base so that the total volume of the samples becomes about 15 cm$^3$. The mass of the samples is measured, and the apparent density of the samples is determined.

An average bubble diameter in a vertical direction (thickness direction) of the foam base used in the present invention is 23 to 50 μm, preferably 25 to 40 μm, and more preferably 25 to 35 μm. When the average bubble diameter in the vertical direction is in the above range, even in the case where a base having a high compressive strength is used in an adhesive tape having a small thickness in the above range, preferable conformability and cushioning properties can be realized, and excellent adhesiveness can be realized even in the joining between rigid components. The average bubble diameter in the vertical direction is preferably ½ or less, and more preferably ⅓ or less of the thickness of the foam base because the density and the strength of the foam base are easily ensured.

Average bubble diameters in a machine direction (flow direction) and a cross-machine direction (width direction) of the foam base used in the present invention are not particularly limited, but are each preferably adjusted to the range of 10 to 700 μm, more preferably 30 to 500 μm, and still more preferably 50 to 400 μm. When the average bubble diameters in the machine direction and in the cross-machine direction are in the above range, the number of independent bubbles that are present per unit width is easily ensured.

Furthermore, a ratio between the average bubble diameter in the machine direction and the average bubble diameter in the cross-machine direction is not particularly limited. However, when the average bubble diameter in the machine direction is assumed to be 1, the ratio is preferably 0.25 to 4 times, more preferably 0.33 to 3 times, still more preferably 0.6 to 1.5 times, and particularly preferably 0.7 to 1.3 times. When the ratio is in the above range, variations in the flexibility and the tensile strength in the machine direction and in the cross-machine direction of the foam base are not easily generated.

Regarding a size of a bubble in the foam base, an average radius obtained when the bubble is converted into a sphere on the basis of an average bubble volume calculated from the average bubble diameters is preferably 50 to 150 μm, and more preferably 70 to 120 μm.

The average bubble diameter in the cross-machine direction, the average bubble diameter in the machine direction, and the average bubble diameter in the vertical direction of a foam base are measured by a method described below. First, the foam base is cut so as to have a dimension in the cross-machine direction of 1 cm and a dimension in the machine direction of 1 cm. Next, a bubble portion in a central portion of a cross section of the cut foam base is enlarged at a magnification of 200 by using a digital microscope (trade name "KH-7700", manufactured by HiROX Co., Ltd.). Subsequently, a cross section in the cross-machine direction or the machine direction of the foam base is observed over the entire length in the vertical direction of the foam base. In the obtained enlarged image, the bubble diameters of all bubbles that are present on a cross section corresponding to an actual length of 2 mm before the magnification in the cross-machine direction or the machine direction are measured. An average bubble diameter is calculated from the average of the bubble diameters. An average bubble diameter is determined from the results measured at 10 arbitrary positions.

The bubble structure of the foam base used in the present invention is preferably an independent bubble structure because entering of water from a cut surface of the foam base can be effectively prevented. Regarding the shape of bubbles forming the independent bubble structure, independent bubbles each preferably have a shape in which the average bubble diameter in the machine direction or in the cross-machine direction or the average bubble diameters in both the machine direction and the cross-machine direction are larger than the average bubble diameter in the vertical direction of the foam base. This is because the foam base has moderate conformability and cushioning properties.

The foam base used in the present invention has an interlaminar strength of 13 N/cm or more, preferably 13 to 150 N/cm, more preferably 13 to 100 N/cm, and still more preferably 15 to 60 N/cm. When the interlaminar strength is in the above range, good conformability to an adherend and excellent impact resistance are easily improved. Furthermore, it is possible to provide the ease of peeling of the adhesive tape in the case where the adhesive tape, a component, or the like is peeled off (reworked) from a workpiece for the purpose of improving the yield during the production of a portable electronic device, or in the case where a housing or a component is separated, disassembled, or dismantled for the purpose of repairing, reproducing, or reusing a finished product.

The interlaminar strength is measured by a method described below. A foam base whose interlaminar strength is to be evaluated is prepared. An adhesive layer which has a thickness of 50 μm and strong adhesiveness (and which is not separated from an adherend and the foam base during a high-speed peeling test described below) is bonded to each surface of the foam base. Subsequently, the resulting foam base is aged at 40° C. for 48 hours to prepare a double-sided adhesive tape for measuring the interlaminar strength. Next, one adhesive surface of the double-sided adhesive tape is lined with a polyester film having a thickness of 25 μm, thus preparing a double-sided adhesive tape sample having a width of 1 cm and a length of 15 cm (in the cross-machine direction and the machine direction of the foam base). The double-sided adhesive tape sample is attached to a polyester film having a thickness of 50 μm, a width of 3 cm, and a length of 20 cm at 23° C. and at 50% RH under pressure by using a 2-kg roller so as to reciprocate once, and is allowed to stand at 60° C. for 48 hours. The resulting sample is allowed to stand at 23° C. for 24 hours. Subsequently, a surface which has been attached to the polyester film having a thickness of 50 μm at 23° C. and at 50% RH is fixed to an attachment jig of a high-speed peel testing machine. The foam is torn by pulling the polyester film having a thickness of 25 μm at a tensile speed of 15 m/min in a direction of 90 degrees. The maximum strength at this time is measured.

The moduli of elasticity in tension in the machine direction and in the cross-machine direction of the foam base used in the present invention are not particularly limited. However, the moduli of elasticity in tension are each preferably 500 N/cm$^2$ or more, and more preferably 600 to 1,500 N/cm$^2$. The tensile elongation at the time of breaking in a tensile test is not particularly limited. However, the tensile elongation in the machine direction is preferably 200% to 1,500%, and more preferably 200% to 1,000%. When the foam base has moduli of elasticity in tension and a tensile elongation in the above ranges, degradation of the processability of the adhesive tape and a decrease in the workability of attachment of the adhesive tape can be suppressed even in the case where the base is a foamed, flexible base. In addition, interlaminar fracture and tearing of the foam are not easily generated when the adhesive tape is peeled off. Even in the case where interlaminar cracking is generated, ease of peeling of the adhesive tape can be provided.

The moduli of elasticity in tension in the machine direction and in the cross-machine direction of the foam base were measured in accordance with JIS K6767. The moduli of elasticity in tension are each a maximum strength measured by using a sample having a length of a reference line of 2 cm and a width of 1 cm with a Tensilon tensile tester in an environment at 23° C. and at 50% RH under a measuring condition of a tensile speed of 300 mm/min.

The compressive strength, the density, the interlaminar strength, the modulus of elasticity in tension, etc. of the foam base can be adjusted by appropriately selecting the material and the foam structure of the base used. The material of the foam base used in the present invention is not particularly limited as long as the 25% compressive strength, the density, etc. can be realized. Examples of the material of the foam base that can be used include polyolefin foams composed of polyethylene, polypropylene, an ethylene-propylene copolymer, an ethylene-vinyl acetate copolymer, or the like; polyurethane foams; and rubber foams composed of an acrylic rubber, another elastomer, or the like. Among these, polyolefin foams are preferably used because it is possible to easily prepare a thin foam base having an independent bubble structure, and having excellent conformability to irregularities on a surface of an adherend, an excellent shock absorbing property, etc.

Among polyolefin foams that use a polyolefin resin, a polyethylene resin is preferably used because a foam base having a uniform thickness is easily produced and preferable flexibility is easily provided. The content of the polyethylene resin in the polyolefin resin is preferably 40% by mass or more, more preferably 50% by mass or more, still more preferably 60% by mass or more, and particularly preferably 100% by mass.

A polyethylene resin obtained by using, as a polymerization catalyst, a metallocene compound containing a tetravalent transition metal is preferably used as the polyethylene resin used in the polyolefin foam. In this case, the polyolefin foam can be uniformly cross-linked because the polyethylene resin has a narrow molecular-weight distribution and, in the case of a copolymer, a comonomer is introduced at substantially the same proportion in any molecular-weight component. Accordingly, since the foamed sheet is uniformly cross-linked, the foamed sheet is easily uniformly stretched as required. Thus, the thickness of the resulting polyolefin resin foam can be easily made uniform as a whole.

Furthermore, the polyolefin resin constituting the polyolefin foam may contain a polyolefin resin other than the polyethylene resin obtained by using, as a polymerization catalyst, a metallocene compound containing a tetravalent transition metal. Examples of such a polyolefin resin include polyethylene resins other than the above polyethylene resin, and polypropylene resins. The polyolefin resins may be used alone or in combination of two or more resins.

Examples of the polyethylene resins include linear low-density polyethylenes, low-density polyethylenes, intermediate-density polyethylenes, high-density polyethylenes, ethylene-α-olefin copolymers containing 50% by weight or more of ethylene, and ethylene-vinyl acetate copolymers containing 50% by weight or more of ethylene. These may be used alone or in combination of two or more resins. Examples of the α-olefin contained in the ethylene-α-olefin copolymers include propylene, 1-butene, 1-pentene, 4-methyl-1-pentene, 1-hexene, 1-heptene, and 1-octene.

Examples of the polypropylene resins include, but are not particularly limited to, polypropylene, and propylene-α-olefin copolymers containing 50% by weight or more of propylene. These may be used alone or in combination of two or more resins. Examples of the α-olefin contained in the propylene-α-olefin copolymers include ethylene, 1-butene, 1 pentene, 4-methyl-1-pentene, 1-hexene, 1-heptene, and 1-octene.

The polyolefin foam may be cross-linked. In the case where a foamable polyolefin resin sheet is foamed by using a thermal decomposition-type foaming agent, the resin sheet is preferably cross-linked. The degree of cross-linking is preferably 5% to 60% by mass, and more preferably 20% to 55% by mass. When the degree of cross-linking is excessively small, in the case where the foam base is stretched, bubbles in the vicinity of a surface of the foamed sheet are broken, and roughening of the surface occurs. Consequently, adhesiveness with an acrylic adhesive layer may decrease. When the degree of cross-linking is excessively large, a melt viscosity of the resulting foamable polyolefin resin composition described below becomes excessively high. Consequently, when the foamable polyolefin resin composition is foamed by heating, the foamable polyolefin resin composition is difficult to follow the foaming, and a cross-linked polyolefin resin foamed sheet having a desired foaming magnification is not obtained. As a result, a shock absorbing property is degraded.

Next, a method for producing a polyolefin resin foam will be described. The method for producing a polyolefin resin foam is not particularly limited. An example of the method includes the steps of supplying, to an extruder, a foamable polyolefin resin composition that contains a polyolefin resin containing 40% by weight or more of a polyethylene resin obtained by using, as a polymerization catalyst, a metallocene compound containing a tetravalent transition metal, a thermal decomposition-type foaming agent, a foaming aid, and a colorant for coloring the resulting foam to black, white, or the like, melt-kneading the foamable polyolefin resin composition, and extruding the kneaded resin composition from the extruder into a sheet to produce a foamable polyolefin resin sheet; cross-linking the foamable polyolefin resin sheet; foaming the foamable polyolefin resin sheet; melting or softening the resulting foamed sheet, and stretching the foamed sheet in either the machine direction or the cross-machine direction or in both the machine direction and the cross-machine direction to stretch the foamed sheet. The step of stretching the foamed sheet may be performed as required. Alternatively, the step of stretching the foamed sheet may be performed a plurality of times.

Examples of the method for cross-linking the polyolefin resin foam base include a method including irradiating a foamable polyolefin resin sheet with ionizing radiation; and a method including blending an organic peroxide with a foamable polyolefin resin composition in advance, and heating the resulting foamable polyolefin resin sheet to decompose the organic peroxide. These methods may be used in combination.

Examples of the ionizing radiation include electron beams, α rays, β rays, and γ rays. The dose of the ionizing radiation is appropriately adjusted so that a gel fraction of the polyolefin resin foam base is in the above preferable range. The dose of the ionizing radiation is preferably in the range of 5 to 200 kGy. From the viewpoint that a uniform foamed state is easily obtained, both surfaces of the foamable polyolefin resin sheet are preferably irradiated with ionizing radiation, and the dose of the ionizing radiation on one of the surfaces is preferably the same as that on the other surface.

Examples of the organic peroxide include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butylperoxide, t-butyl cumylperoxide, dicumylperoxide, α,α'-bis(t-butylperoxy-m-isopropyl)benzene, 2,5-dimethyl-2,5-di(t-butylperoxy) hexane, 2,5-dimethyl-2,5-di(t-butylperoxy)hexyne-3, benzoyl peroxide, cumylperoxy neodecanate, t-butylperoxy benzoate, 2,5-dimethyl-2,5-di(benzoylperoxy)hexane, t-butylperoxyisopropyl carbonate, and t-butylperoxyallyl carbonate. These may be used alone or in combination of two or more organic peroxides.

The amount of organic peroxide added is preferably 0.01 to 5 parts by weight, and more preferably 0.1 to 3 parts by weight relative to 100 parts by weight of the polyolefin resin. When the amount of organic peroxide is excessively small, cross-linking of the foamable polyolefin resin sheet may be insufficient. When the amount of organic peroxide is excessively large, a decomposition residue of the organic peroxide may remain in the resulting cross-linked polyolefin resin foamed sheet.

The amount of thermal decomposition-type foaming agent added in the foamable polyolefin resin composition may be appropriately determined in accordance with the foaming magnification of the polyolefin resin foam base. The amount of thermal decomposition-type foaming agent is preferably 1 to 40 parts by weight, and more preferably 1 to 30 parts by weight relative to 100 parts by weight of the polyolefin resin. When the amount of thermal decomposition-type foaming agent is excessively small, a foaming property of the foamable polyolefin resin sheet is decreased, and a polyolefin resin foam base having a desired foaming magnification may not be obtained. When the amount of thermal decomposition-type foaming agent is excessively large, the tensile strength and compression restorability of the resulting polyolefin resin foam base may be decreased.

Examples of the method for foaming the foamable polyolefin resin sheet include, but are not particularly limited to, a method including heating with hot air, a method including heating by infrared rays, a method using a salt bath, and a method using an oil bath. These methods may be used in combination. Among these methods, the method including heating with hot air and the method including heating by infrared rays are preferable because the difference in the appearance between the front surface and the back surface of the resulting polyolefin resin foam base is small.

The foaming magnification of the foam base is not particularly limited. However, the foaming magnification of the foam base is preferably 1.5 to 5 times, more preferably 1.8 to 3.5 times, and still more preferably 1.8 to 3 times because the impact resistance, excellent adhesiveness to an adherend, and reworkability are easily realized by adjusting the 25% compressive strength, the density, the interlaminar strength, etc. in the case of a small thickness to the ranges described above.

The stretching of the foam base may be performed after a foamable polyolefin resin sheet is foamed to obtain a foam base. Alternatively, the stretching of the foam base may be performed while a foamable polyolefin resin sheet is foamed. In the case where a foamable polyolefin resin sheet is foamed to obtain a foam base and the foam base is then stretched, the foam base may be continuously stretched while maintaining the molten state during foaming without cooling the foam base. Alternatively, in such a case, after the foam base is cooled, the resulting foamed sheet may be heated again to be in a molten or softened state and the foam base may then be stretched.

Herein, the term "molten state of a foam base" refers to a state in which the foam base is heated so that the temperature of both surfaces thereof is increased to the melting point of a polyolefin resin constituting the foam base or higher. The term "softening of a foam base" refers to a state in which the foam base is heated so that the temperature of both surfaces thereof is increased to a temperature of 20° C. or higher and lower than the melting point of a polyolefin resin constituting the foam base. By stretching the foam base, bubbles in the foam base are stretched in a predetermined direction and deformed. Thus, it is possible to produce a polyolefin foam in which an aspect ratio of the bubbles is in a predetermined range.

Furthermore, regarding a stretching direction of a foam base, stretching is performed in the machine direction or the cross-machine direction of a long foamable polyolefin resin sheet, or in the machine direction and the cross-machine direction of a long foamable polyolefin resin sheet. In the case where a foam base is stretched in the machine direction and the cross-machine direction, the foam base may be simultaneously stretched in the machine direction and the cross-machine direction or respectively stretched in each of the directions.

Examples of the method for stretching the foam base in the machine direction include a method for stretching the foam base in the machine direction, the method including making a speed (take-up speed) of taking up a long foamed sheet while cooling after foaming faster than a speed (feed speed) of feeding a long foamable polyolefin resin sheet to the foaming step; and a method for stretching the foam base in the machine direction, the method including making a speed (take-up speed) of taking up a foam base faster than a speed (feed speed) of feeding the foam base to the stretching step.

Note that, in the former method, the foamable polyolefin resin sheet is expanded in the machine direction as a result of foaming of the resin sheet itself. Accordingly, in the case where the foam base is stretched in the machine direction, it is necessary to adjust the feed speed and the take-up speed of the foam base in consideration of the amount of expansion in the machine direction as a result of foaming of the foamable polyolefin resin sheet so that the foam base is stretched in the machine direction by an amount larger than the amount of expansion.

The method for stretching the foam base in the cross-machine direction is preferably a method for stretching the foam base in the cross-machine direction, the method including holding both ends of the foam base in the cross-machine direction with a pair of holding members, and gradually moving the pair of holding members in directions in which the holding members are separated from each other. Note that the foamable polyolefin resin sheet is expanded in the cross-machine direction as a result of foaming of the resin sheet itself. Accordingly, in the case where the foam base is stretched in the cross-machine direction, it is necessary to perform adjustment in consideration of the amount of expansion in the cross-machine direction as a result of foaming of the foamable polyolefin resin sheet so that the foam base is stretched in the cross-machine direction by an amount larger than the amount of expansion.

Herein, regarding a stretch ratio of a polyolefin foam, a stretch ratio in the machine direction in the case where stretching is first performed in the machine direction, and then performed in the cross-machine direction is preferably 1.1 to 2.0 times, and more preferably 1.2 to 1.5 times. When the stretch ratio in the machine direction is excessively small, the flexibility and tensile strength of the polyolefin resin foam base may be decreased. When the stretch ratio in the machine direction is excessively large, the foam base may be cut during stretching or a foaming gas is escaped from the foam base during foaming, resulting in a significant decrease in the foaming magnification of the polyolefin resin foam base. Consequently, the flexibility and tensile strength of the polyolefin resin foam base may be decreased, and the quality of the polyolefin resin foam base may become uneven.

A stretch ratio in the cross-machine direction is preferably 1.2 to 4.5 times, and more preferably 1.5 to 3.5 times. When the stretch ratio of the polyolefin foam base in the cross-machine direction is excessively small, the flexibility and tensile strength of the polyolefin foam base may be decreased. When the stretch ratio of the polyolefin foam base in the cross-machine direction is excessively large, the foam base may be cut during stretching or a foaming gas is escaped from the foam base during foaming, resulting in a significant decrease in the foaming magnification of the polyolefin foam base. Consequently, the flexibility and tensile strength of the polyolefin foam base may be decreased, and the quality of the polyolefin foam base may become uneven.

In the case where stretching is first performed in the cross-machine direction, and then performed in the machine direction, a stretch ratio in the cross-machine direction is preferably the same as the above-described stretch ratio in the machine direction, and a stretch ratio in the machine direction is preferably the same as the above-described stretch ratio in the cross-machine direction.

The foam base may be colored for the purpose of exhibiting a design property, a light-shielding property, a concealing property, a light-reflecting property, and lightfastness in the adhesive tape. Colorants may be used alone or in combination of two or more colorants.

In the case where a light-shielding property, a concealing property, and lightfastness are provided to an adhesive tape, the foam base is colored in black. Examples of black colorants that can be used include carbon black, graphite, copper oxide, manganese dioxide, aniline black, perylene black, titanium black, cyanine black, activated carbon, ferrite, magnetite, chromium oxide, iron oxide, molybdenum disulfide, chromium complexes, compound oxide-based black coloring agents, and anthraquinone-based organic black coloring agents. Among these, carbon black is preferable from the viewpoint of the cost, availability, insulating property, and heat resistance for withstanding the temperatures in a step of extruding a foamable polyolefin resin composition and in a step of foaming by heating.

In the case where a design property, a light-reflecting property, and the like are provided to an adhesive tape, the foam base is colored in white. Examples of white colorants that can be used include inorganic white colorants such as titanium oxide, zinc oxide, aluminum oxide, silicon oxide, magnesium oxide, zirconium oxide, calcium oxide, tin oxide, barium oxide, cesium oxide, yttrium oxide, magnesium carbonate, calcium carbonate, barium carbonate, zinc carbonate, aluminum hydroxide, magnesium hydroxide, calcium hydroxide, zinc hydroxide, aluminum silicate, calcium silicate, barium sulfate, calcium sulfate, barium stearate, zinc white, talc, silica, alumina, clay, kaolin, titanium phosphate, mica, gypsum, white carbon, diatomaceous earth, bentonite, lithopone, zeolite, and sericite; and organic white colorants such as silicone resin particles, acrylic resin particles, urethane resin particles, and melamine resin particles. Among these, aluminum oxide and zinc oxide are preferable from the viewpoint of the cost, availability, color tone, and heat resistance for withstanding the temperatures in a step of extruding a foamable polyolefin resin composition and in a step of foaming by heating.

The foamable polyolefin resin composition may optionally contain known additives such as a plasticizer, an antioxidant, a foaming aid, e.g., zinc oxide, a bubble nucleation adjusting agent, a thermal stabilizer, a flame retardant, e.g., aluminum hydroxide or magnesium hydroxide, an antistatic agent, a filler, e.g., a hollow balloon or a bead composed of glass or a plastic, a metal powder, or a metal compound, an electrically conductive filler, and a thermally conductive filler as long as physical properties of the polyolefin resin foam base are not impaired. Regarding the polyolefin resin foam base used in the adhesive tape of the present invention, in order to maintain moderate conformability and cushioning properties, the content of the additives is preferably 0.1% to 10% by mass, and more preferably 1% to 7% by mass relative to the polyolefin resin.

In the case where the colorants, the thermal decomposition-type foaming agents, the foaming aids, and the like are blended in the foamable polyolefin resin composition, from the viewpoint of preventing the generation of an uneven color, abnormal foaming, and foaming defects, these components are preferably prepared in advance in the form of a masterbatch including a foamable polyolefin resin composition or a thermoplastic resin having high compatibility with a foamable polyolefin resin composition before the components are fed to an extruder.

In order to improve adhesiveness with an adhesive layer or other layers, the foam base may be subjected to a surface treatment such as a corona treatment, a flame treatment, a plasma treatment, a hot-air treatment, an ozone/ultraviolet light treatment, application of an adhesion-facilitating treatment agent, or the like. The surface treatment is performed so that a wetting index determined by using a wetting reagent becomes 36 mN/m or more, preferably 40 mN/m, and more preferably 48 mN/m. In this case, good adhesiveness with an adhesive is obtained. The foam base having improved adhesiveness may be attached to an adhesive layer in a continuous process. Alternatively, the foam base having improved adhesiveness may be temporarily subjected to a take-up process. In the case where the foam base is temporarily taken up, the foam base is preferably taken up together with a slip sheet such as paper or a film composed of polyethylene, polypropylene, polyester, or the like in order to prevent a blocking phenomenon between foam bases, which have improved adhesiveness. A polypropylene film or polyester film having a thickness of 25 μm or less is preferable.

[Adhesive Layer]

An adhesive composition used in common adhesive tapes can be used as an adhesive composition that constitutes an adhesive layer of the adhesive tape of the present invention. Examples of the adhesive composition include (meth)acrylic adhesives, urethane adhesives, synthetic rubber adhesives, natural rubber adhesives, and silicone adhesives. (Meth)acrylic adhesive compositions containing, as a base polymer, an acrylic copolymer of (meth)acrylates alone or an acrylic copolymer composed of a copolymer of (meth)acrylates and other monomers, and, as required, additives such as a tackifying resin and a cross-linking agent can be preferably used.

Examples of (meth)acrylates having 1 to 12 carbon atoms include monomers such as methyl(meth)acrylate, ethyl (meth)acrylate, n-butyl(meth)acrylate, isobutyl(meth)acrylate, t-butyl(meth)acrylate, n-hexyl(meth)acrylate, n-octyl (meth)acrylate, isooctyl(meth)acrylate, isononyl(meth) acrylate, cyclohexyl (meth)acrylate, and 2-ethylhexyl(meth) acrylate. These may be used alone or in combination of two or more monomers. Among these, (meth)acrylates whose alkyl group has 4 to 12 carbon atoms are preferable, and (meth)acrylates having a linear or branched structure having 4 to 8 carbon atoms are more preferable. In particular, n-butyl acrylate is preferable because adhesiveness to an adherend is easily obtained and n-butyl acrylate is excellent in terms of cohesive force and resistance to sebum or the like.

The content of a (meth)acrylate having 1 to 12 carbon atoms in the acrylic copolymer is preferably 80% to 98.5% by mass, and more preferably 90% to 98.5% by mass of monomer components that constitute the acrylic copolymer.

The acrylic copolymer used in the present invention may be prepared by copolymerizing a highly polar vinyl monomer. Examples of the highly polar vinyl monomer include vinyl monomers having a hydroxyl group, vinyl monomers having a carboxyl group, and vinyl monomers having an amide group. These may be used alone or in combination of two or more monomers.

Examples of the monomers having a hydroxyl group and capable of being used include hydroxyl group-containing (meth)acrylates such as 2-hydroxyethyl(meth)acrylate, 2-hydroxypropyl(meth)acrylate, 4-hydroxybutyl(meth)acrylate, and 6-hydroxyhexyl(meth)acrylate.

Examples of the vinyl monomers having a carboxyl group and capable of being used include acrylic acid, methacrylic acid, itaconic acid, maleic acid, (meth)acrylic acid dimer, crotonic acid, and ethylene oxide-modified succinic acid acrylate. Among these, acrylic acid is preferably used as a comonomer.

Examples of the monomer having an amide group include N-vinylpyrrolidone, N-vinylcaprolactam, acryloylmorpholine, acrylamide, and N,N-dimethylacrylamide.

Examples of other highly polar vinyl monomers include vinyl acetate, ethylene oxide-modified succinic acid acrylate, and sulfonic group-containing monomers such as 2-acrylamide-2-methylpropane sulfonic acid.

The content of the highly polar vinyl monomer is preferably 1.5% to 20% by mass, more preferably 1.5% to 10% by mass, and still more preferably 2% to 8% by mass of the monomer components that constitute the acrylic copolymer. When the highly polar vinyl monomer is incorporated in this range, a cohesive force, a holding force, and adhesiveness of an adhesive are easily adjusted to preferable ranges.

In the case where an isocyanate cross-linking agent is used as the cross-linking agent, a vinyl monomer that has a functional group and that reacts with the isocyanate cross-linking agent is preferably a hydroxyl group-containing vinyl monomer, and particularly preferably 2-hydroxyethyl (meth)acrylate, 4-hydroxybutyl(meth)acrylate, or 6-hydroxyhexyl(meth)acrylate. The content of the hydroxyl group-containing vinyl monomer that reacts with the isocyanate cross-linking agent is preferably 0.01% to 1.0% by mass, and particularly preferably 0.03% to 0.3% by mass of the monomer components that constitute the acrylic copolymer.

The acrylic copolymer can be obtained by performing copolymerization using a known polymerization method such as a solution polymerization method, a bulk polymerization method, a suspension polymerization method, or an emulsion polymerization method. From the viewpoint of water resistance of the adhesive, a solution polymerization method or a bulk polymerization method is preferable. Examples of a method for initiating polymerization include an initiation method by heating using a thermal polymerization initiator such as a peroxide initiator, e.g., benzoyl peroxide or lauroyl peroxide or an azo initiator, e.g., azobisisobutyronitrile, an initiation method by irradiation with ultraviolet light using a photopolymerization initiator such as an acetophenone initiator, a benzoin ether initiator, a benzyl ketal initiator, an acyl phosphine oxide initiator, a benzoin initiator, or a benzophenone initiator, and an initiation method by irradiation with an electron beam. Any of these methods can be selected.

Regarding a molecular weight of the acrylic copolymer, a weight-average molecular weight measured by gel permeation chromatography (GPC) and determined in terms of standard polystyrene is 400,000 to 3,000,000, and preferably 800,000 to 2,500,000.

Herein, the molecular weight measured by the GPC method is a value determined on a standard polystyrene equivalent basis by using a GPC apparatus (HLC-8329GPC) manufactured by Tosoh Corporation. The measurement conditions are as follows.

Sample concentration: 0.5% by mass (tetrahydrofuran (THF) solution)
Amount of injection of sample: 100 μL
Eluent: THF
Flow rate: 1.0 mL/min
Measurement temperature: 40° C.
Analytical column: TSKgel GMHHR-H (20), two columns
Guard column: TSKgel HXL-H
Detector: Differential refractometer
Molecular weight of standard polystyrene: 10,000 to 20,000,000 (manufactured by Tosoh Corporation)

In order to improve adhesiveness to an adherend and a surface adhesive strength, a tackifying resin is preferably used in the acrylic adhesive composition used in the present invention. Examples of the tackifying resin include rosins, polymerized rosins, polymerized rosin esters, rosin phenols, stabilized rosin esters, disproportionated rosin esters, hydrogenated rosin esters, terpenes, terpene phenols, petroleum resins, and (meth)acrylate resins. In the case where a tackifying resin is used in an emulsion-type adhesive composition, emulsion-type tackifying resins are preferably used.

Among the above resins, disproportionated rosin ester tackifying resins, polymerized rosin ester tackifying resins, rosin phenol tackifying resins, hydrogenated rosin ester tackifying resins, and (meth)acrylate resins are preferable. These tackifying resins may be used alone or in combination of two or more resins.

The softening point of the tackifying resin is not particularly limited, but is 30° C. to 180° C. and preferably 70° C. to 140° C. By incorporating a tackifying resin having a high softening point, high adhesion performance can be expected. In the cases of (meth)acrylate tackifying resins, the glass transition temperature of the resins is 30° C. to 200° C., and preferably 50° C. to 160° C.

Regarding a blending ratio in the case where an acrylic copolymer and a tackifying resin are used, the content of the tackifying resin relative to 100 parts by mass of the acrylic copolymer is preferably 5 to 60 parts by mass, and more preferably 8 to 50 parts by mass. When the ratio of the tackifying resin to the acrylic copolymer is in the above range, adhesiveness to an adherend is easily ensured.

In order to increase a cohesive force of an adhesive layer, the adhesive is preferably cross-linked in an acrylic adhesive composition. Examples of the cross-linking agent include isocyanate cross-linking agents, epoxy cross-linking agents, metal chelate cross-linking agents, and aziridine cross-linking agents. Among these, cross-linking agents that are added after the completion of polymerization and that allow a cross-linking reaction to proceed are preferable. Isocyanate cross-linking agents and epoxy cross-linking agents, which have high reactivity with (meth)acrylic copolymers, are preferable. From the viewpoint of improving adhesiveness to a foam base, isocyanate cross-linking agents are more preferable.

Examples of the isocyanate cross-linking agents include tolylene diisocyanate, naphthylene-1,5-diisocyanate, hexamethylene diisocyanate, diphenylmethane diisocyanate, xylylene diisocyanate, and trimethylolpropane-modified tolylene diisocyanate. Trifunctional polyisocyanate compounds are particularly preferable. Examples of the trifunctional isocyanate compounds include tolylene diisocyanate and trimethylolpropane adducts thereof, and triphenylmethane isocyanate.

A gel fraction determined by measuring insoluble matter after an adhesive layer is immersed in toluene for 24 hours is used as an index of the degree of cross-linking. The gel fraction is preferably 25% to 70% by mass. The gel fraction is more preferably 30% to 60% by mass, and still more preferably 30% to 55% by mass. When the gel fraction is in this range, both a good cohesive property and a good adhesive property are obtained.

The gel fraction is measured as follows. An adhesive composition is applied onto a release sheet so as to have a thickness of 50 μm after drying, dried at 100° C. for three minutes, and aged at 40° C. for two days. The resulting film of the adhesive composition is cut so as to have a 50 mm square shape. This film is used as a sample. Next, a weight (G1) of the sample before immersion in toluene is measured in advance. The sample is immersed in a toluene solution at 23° C. for 24 hours. Toluene-insoluble matter of the sample is then separated by filtration with a 300-mesh wire gauze, and dried at 110° C. for one hour. A weight (G2) of the resulting residue is then measured. The gel fraction is determined in accordance with a formula below:

$$\text{Gel fraction}(\% \text{ by mass}) = (G2/G1) \times 100$$

Known additives such as plasticizers; softening agents; antioxidants; flame retardants; fillers such as a fiber, balloon, or bead composed of glass or a plastic, a metal powder, a metal oxide, or a metal nitride; colorants such as a pigment or a dye; leveling agents; viscosity improvers; water repellents; and antifoaming agents may be optionally added, as additives of an adhesive, to the adhesive composition.

Regarding the adhesive layer used in the adhesive tape of the present invention, a temperature at which a loss tangent (tan δ) at a frequency of 1 Hz becomes a peak value is preferably −40° C. to 15° C. When the peak value of the loss tangent of the adhesive layer is in the above range, good adhesiveness to an adherend at room temperature is easily provided. In particular, in order to improve drop impact resistance in a low-temperature environment, the temperature is more preferably −35° C. to 10° C., and still more preferably −30° C. to 6° C.

The loss tangent (tan δ) at a frequency of 1 Hz is determined by a formula tan δ=G″/G′ from a storage modulus (G′) and a loss modulus (G″) determined by a temperature dispersion measurement of dynamic viscoelasticity. The dynamic viscoelasticity is measured by using a viscoelasticity tester (manufactured by TA Instruments Japan Inc., trade name: ARES G2). A test piece of an adhesive layer formed so as to have a thickness of about 2 mm is interposed between parallel discs having a diameter of 8 mm and used as a measurement unit of the tester. The storage modulus (G') and the loss modulus (G") are measured from −50° C. to 150° C. at a frequency of 1 Hz.

The thickness of the adhesive layer used in the present invention is preferably 10 to 100 μm, and more preferably 20 to 80 μm because adhesiveness to an adherend, reworkability, and removability are easily obtained even in the case where the adhesive layer is used in a thin adhesive tape.

[Adhesive Tape]

An adhesive tape of the present invention includes the foam base described above and an adhesive layer disposed on at least one surface, preferably both surfaces of the foam base. Accordingly, the adhesive tape has suitable impact resistance, conformability to an adherend, and reworkability. Thus, even when a panel of a large screen is fixed by using the adhesive tape or even when a panel is fixed by using the adhesive tape having a small width, detachment of the adhesive tape does not easily occur at the time of dropping. The adhesive tape of the present invention can be suitably used in portable electronic devices such as smartphones and tablet personal computers whose screen sizes have been increasing and for which a requirement for flexible design is high. Accordingly, waterproofness, drip-proofness, and dust resistance can be effectively provided even to, for example, portable electronic devices whose thicknesses have been decreasing, in which the space in a housing is strictly limited, and for which it is difficult to provide separate sealing means. Furthermore, since the foam base and the adhesive layer are used, the adhesive tape can exhibit good adhesiveness to an adherend, effectively prevent water and dust from entering from a gap in a close contact portion, and thus has excellent waterproofness, excellent drip-proofness, and excellent dust resistance. Furthermore, fixed components can be suitable separated.

The adhesive tape according to an embodiment of the present invention has a basic structure in which an adhesive layer is provided on at least one surface, preferably both surfaces of a foam base serving as a central core. The base and the adhesive layer may be stacked either directly or with another layer therebetween. The form of the adhesive tape may be appropriately selected in accordance with the use. In the case where dimensional stability or a tensile strength is further provided to the tape, a laminate layer such as a polyester film may be provided. In the case where a light-shielding property is provided to the tape, a light-shielding layer may be provided. In the case where a light-reflecting property is ensured, a light-reflecting layer may be provided. In the cases where any of these other layers is provided, a waterproof layer is used as the other layer.

Examples of the laminate layer include resin films such as polyester films composed of polyethylene terephthalate or the like, polyethylene films, and polypropylene films. From the viewpoint of conformability of the foam base, the thicknesses of these films are preferably 1 to 16 μm and more preferably 2 to 12 μm.

An example of the light-shielding layer that can be easily used is a layer formed by using an ink containing a colorant such as a pigment. A layer composed of a black ink is preferably used because such a layer has an excellent light-shielding property. An example of the light-reflecting layer that can be easily used is a layer formed by using a white ink. The thicknesses of these layers are preferably 2 to 20 μm, and more preferably 4 to 6 μm. When the thicknesses are in the above range, curl of the base due to the cure shrinkage of the ink does not easily occur, and thus good processability of the tape is obtained.

The adhesive tape of the present invention can be produced by a publicly known and commonly used method. Examples of the method include a direct application method including applying an adhesive composition onto a foam base directly or onto a surface of another layer stacked on a foam base, and drying the adhesive composition, and a transfer method including applying an adhesive composition onto a release sheet, drying the adhesive composition, and then bonding the adhesive composition provided on the release sheet to a foam base or a surface of another layer. In the case where the adhesive layer is prepared by drying a mixture of an acrylic adhesive composition and a cross-linking agent, after the preparation of an adhesive tape, aging is preferably performed in an environment at 20° C. to 50° C., preferably 23° C. to 45° C. for two to seven days because adhesiveness between the foam base and the adhesive layer and adhesive physical properties are stabilized.

The thickness of the adhesive tape of the present invention may be appropriately adjusted in accordance with the form used. In the case where the adhesive tape is used for fixing a component of a compact and thin portable electronic device, the thickness of the adhesive tape is preferably 50 to 320 μm, more preferably 70 to 300 μm, and particularly preferably 100 to 250 μm. When the tape thickness is in the above thickness range, the adhesive tape can also be suitably used in thin and compact portable electronic devices, and in addition to good conformability and impact resistance, suitable reworkability can be realized.

The double-sided adhesive tape of the present invention has a surface adhesive strength of preferably 100 N/4 $cm^2$ or more, and more preferably 130 N/4 $cm^2$ or more, the surface adhesive strength being measured under measurement conditions described below.

The conditions for the measurement of the surface adhesive strength are as follows.

1) Two strips of a double-sided adhesive tape having a width of 5 mm and a length of 4 cm are attached at 23° C. to an acrylic board that is 2 mm thickness and 5 cm square so as to be parallel to each other.

2) Next, the acrylic board with the double-sided adhesive tape strips prepared in 1) is attached to a smooth ABS board which has a thickness of 2 mm and a rectangular shape of 10×15 cm and in which a hole having a diameter of 1 cm is formed in a central portion thereof such that the center of the acrylic board coincides with the center of the ABS board. A pressure is applied thereto by using a 2 kg-roller so as to reciprocate once. The resulting boards are then allowed to stand at 23° C. for one hour. Thus, a test piece is prepared.

3) The acrylic board is pressed at a rate of 10 mm/min from the ABS side of the test piece through the hole of the ABS board by using a tensile testing machine provided with a stainless steel probe having a diameter of 8 mm. A strength at which the acrylic board is detached is measured.

Examples of the release sheet used in the present invention include, but are not particularly limited to, bases such as synthetic resin films, e.g., a polyethylene, polypropylene, and polyester films, paper, non-woven fabrics, cloths, foamed sheets, metal foils, and laminates thereof, at least one surface of which has been subjected to a release treatment for enhancing a property of separating from an adhesive, such as a silicone treatment, a long-chain alkyl treatment, or a fluorine treatment.

Among these, preferable are woodfree paper, both surfaces of which are laminated with polyethylene having a thickness of 10 to 40 μm, and a release sheet prepared by performing a silicone release treatment on one surface or both surfaces of a base formed of a polyester film.

The adhesive tape of the present invention has good conformability to an adherend. Therefore, the adhesive tape can effectively prevent water and dust from entering from a gap in a close contact portion, and thus has excellent waterproofness, excellent drip-proofness, and excellent dust resistance. Accordingly, waterproofness, drip-proofness, and dust resistance can be effectively provided even to, for example, portable electronic devices whose thicknesses have been decreasing, in which the space in a housing is strictly limited, and for which it is difficult to provide separate sealing means. In the fixation of an information display unit having a large screen size or a panel that protects such an information display unit, and in the fixation of a protective panel or an information display device module with an adhesive tape having a small width, a good adhesive property and good conformability to an adherend, and excellent impact resistance can be realized. Furthermore, since the adhesive tape has excellent reworkability together with these properties, it is easy to separate components that are fixed to each other and to detach the adhesive tape from a component.

The adhesive tape of the present invention has the excellent properties described above, and thus can be suitably used in portable electronic devices such as electronic notebooks, cellular phones, PHS, digital cameras, music players, televisions, notebook personal computers, smartphones, tablet personal computers, and game machines. In particular, the adhesive tape of the present invention can be suitably used for bonding between a housing and a panel that protects an information display device such as an LCD or an OELD, bonding between housings, bonding between a housing and an information input device such as a touch panel or a sheet-like ten keypad, and bonding between a housing and an information display device such as an LCD or OELD having a diagonal length of 3.5 to 16 inches. Furthermore, the adhesive tape of the present invention can be suitably used for, for example, fixing built-in batteries, speakers, receivers, piezoelectric elements, printed circuit boards, flexible printed circuit boards (FPC), digital camera modules, sensors, other modules, cushioning materials composed of polyurethane, polyolefin, or the like, rubber members, decorating components, and various members. In particular, even in portable electronic terminals which have a diagonal length of 3.5 to 16 inches, preferably 3.5 to 12.1 inches, whose screen sizes of information display units have been increasing, and which receive large shocks at the time of falling, excellent impact resistance can be realized even when, for example, the portable electronic devices fall from a desk or are dropped during operation while a user is walking. Therefore, the adhesive tape of the present invention can be particularly suitably used for fixing components of such portable electronic terminals having large screens.

EXAMPLES (Preparation of Adhesive Composition (A))

In a reaction vessel equipped with a stirrer, a reflux condenser, a thermometer, a dropping funnel, and a nitrogen gas inlet, 93.4 parts by mass of n-butyl acrylate, 3.5 parts by mass of acrylic acid, 3 parts by mass of vinyl acetate, 0.1 parts by mass of 2-hydroxyethyl acrylate, and 0.1 parts by mass of 2,2'-azobisisobutyronitrile serving as a polymerization initiator were dissolved in 100 parts by mass of ethyl acetate serving as a solvent, and polymerization was conducted at 70° C. for 12 hours. Thus, an acrylic copolymer (1) having a weight-average molecular weight of 1,600,000 (in terms of polystyrene) was obtained. Next, 9.4 parts by mass of "Super Ester A100" (glycerin ester of disproportionated rosin) manufactured by Arakawa Chemical Industries, Ltd. and 9.4 parts by mass of "HARITACK PCJ" (pentaerythritol ester of polymerized rosin) manufactured by Harima Chemicals, Inc. were added to 100 parts by mass of the acrylic copolymer (1). Ethyl acetate was added to the mixture, and the resulting mixture was uniformly mixed. Thus, an adhesive composition (A) having a content of non-volatile matter of 38% was prepared.

(Preparation of Adhesive Composition (B))

In a reaction vessel equipped with a stirrer, a reflux condenser, a thermometer, a dropping funnel, and a nitrogen gas inlet, 97.97 parts by mass of n-butyl acrylate, 2.0 parts by mass of acrylic acid, 0.03 parts by mass of 4-hydroxybutyl acrylate, and 0.1 parts by mass of 2,2'-azobisisobutyronitrile serving as a polymerization initiator were dissolved in 100 parts by mass of ethyl acetate serving as a solvent, and polymerization was conducted at 70° C. for 12 hours. Thus, an acrylic copolymer (2) having a weight-average molecular weight of 2,000,000 (in terms of polystyrene) was obtained. Next, 25 parts by mass of "Super Ester A100" (glycerin ester of disproportionated rosin) manufactured by Arakawa Chemical Industries, Ltd., 5 parts by mass of "PENSEL D135" (pentaerythritol ester of polymerized rosin) manufactured by Arakawa Chemical Industries, Ltd., and 20 parts by mass of FTR6100 (styrene-based petroleum resin) manufactured by Mitsui Chemicals Inc. were added to 100 parts by mass of the acrylic copolymer (2). Ethyl acetate was added to the mixture, and the resulting mixture was uniformly mixed. Thus, an adhesive composition (B) having a content of non-volatile matter of 40% was prepared.

(Preparation of Adhesive Composition (C))

In a reaction vessel equipped with a stirrer, a reflux condenser, a thermometer, a dropping funnel, and a nitrogen gas inlet, 63.3 parts by mass of butyl acrylate, 30.1 parts by mass of 2-ethylhexyl acrylate, 3 parts by mass of acrylic acid, 3.5 parts by mass of vinyl acetate, 0.1 parts by mass of 4-hydroxybutyl acrylate, and 0.1 parts by mass of 2,2'-azobisisobutyronitrile serving as a polymerization initiator were dissolved in 100 parts by mass of ethyl acetate serving as a solvent, and polymerization was conducted at 70° C. for 12 hours. Thus, an acrylic copolymer (3) having a weight-average molecular weight of 1,000,000 (in terms of polystyrene) was obtained. Next, 20 parts by mass of "PENSEL D135" (pentaerythritol ester of polymerized rosin) manufactured by Arakawa Chemical Industries, Ltd. was added to 100 parts by mass of the acrylic copolymer (3). Ethyl acetate was added to the mixture, and the resulting mixture was uniformly mixed. Thus, an adhesive composition (C) having a content of non-volatile matter of 40% was prepared.

Example 1

(Preparation of Double-sided Adhesive Tape)

First, 1.1 parts by mass of "Coronate L-45" (isocyanate cross-linking agent, solid content: 45%) manufactured by Nippon Polyurethane Industry Co., Ltd. was added relative to 100 parts by mass of the adhesive composition (A), and the resulting mixture was stirred for 15 minutes. The mixture was then applied onto a release-treated surface of a polyethylene terephthalate (PET) film having a thickness of 75 μm, the PET film having been subjected to a release treatment, such that the thickness after drying became 50 μm. Drying was performed at 80° C. for three minutes to form an adhesive layer. The adhesive layer had a gel fraction of 48% by mass and a temperature at which a loss tangent (tan δ) at a frequency of 1 Hz became a peak value of −16° C.

Next, the adhesive layer was bonded to each surface of a base formed of a black polyolefin foam (1) (thickness: 100 μm, apparent density: 0.41 g/cm³, 25% compressive strength: 190 kPa, modulus of elasticity in tension in machine direction: 964 N/cm², modulus of elasticity in tension in cross-machine direction: 861 N/cm², interlaminar strength: 16.2 N/cm). The base was then laminated with the adhesive layers at 23° C. with a roll at a line pressure of 5 kg/cm. Subsequently, aging was performed at 40° C. for 48 hours. Thus, a double-sided adhesive tape having a thickness of 200 μm was obtained.

Example 2

A double-sided adhesive tape having a thickness of 200 μm was obtained by the same method as in Example 1 except that the adhesive composition (B) was used instead of the adhesive composition (A), and 1.33 parts by mass of "Coronate L-45" (isocyanate cross-linking agent, solid content: 45%) manufactured by Nippon Polyurethane Industry Co., Ltd. was added relative to 100 parts by mass of the adhesive composition (B). The adhesive layer had a gel fraction of 37% by mass and a temperature at which a loss tangent (tan δ) at a frequency of 1 Hz became a peak value of 2° C.

Example 3

A double-sided adhesive tape having a thickness of 200 μm was obtained by the same method as in Example 1 except that the adhesive composition (C) was used instead of the adhesive composition (A), and 1.7 parts by mass of "Coronate L-45" (isocyanate cross-linking agent, solid content: 45%) manufactured by Nippon Polyurethane Industry Co., Ltd. was added relative to 100 parts by mass of the adhesive composition (C). The adhesive layer had a gel fraction of 40% by mass and a temperature at which a loss tangent (tan δ) at a frequency of 1 Hz became a peak value of −12° C.

Example 4

A double-sided adhesive tape having a thickness of 150 μm was obtained by the same method as in Example 1 except that the thickness of the adhesive composition (A) after drying was 25 μm.

Example 5

A double-sided adhesive tape having a thickness of 210 μm was obtained by the same method as in Example 1 except that a black polyolefin foam (2) (thickness: 110 μm, apparent density: 0.46 g/cm³, 25% compressive strength: 270 kPa, modulus of elasticity in tension in machine direction: 1,456 N/cm², modulus of elasticity in tension in cross-machine direction: 956 N/cm², interlaminar strength: 13.6 N/cm) was used instead of the black polyolefin foam (1).

Example 6

A double-sided adhesive tape having a thickness of 160 μm was obtained by the same method as in Example 1 except that a black polyolefin foam (7) (thickness: 80 μm, apparent density: 0.48 g/cm³, 25% compressive strength: 350 kPa, modulus of elasticity in tension in machine direction: 1,320 N/cm², modulus of elasticity in tension in cross-machine direction: 750 N/cm², interlaminar strength: 14.4 N/cm) was used instead of the black polyolefin foam (1) and the thickness of the adhesive layer after drying was 40 μm.

Comparative Example 1

A double-sided adhesive tape having a thickness of 200 μm was obtained by the same method as in Example 1 except that a black polyolefin foam (3) (thickness: 100 μm, apparent density: 0.33 g/cm³, 25% compressive strength: 70 kPa, modulus of elasticity in tension in machine direction: 799 N/cm², modulus of elasticity in tension in cross-machine direction: 627 N/cm², interlaminar strength: 8.9 N/cm) was used instead of the black polyolefin foam (1).

Comparative Example 2

A double-sided adhesive tape having a thickness of 200 μm was obtained by the same method as in Example 1 except that a black polyolefin foam (4) (thickness: 100 μm, apparent density: 0.36 g/cm³, 25% compressive strength: 103 kPa, modulus of elasticity in tension in machine direction: 1,084 N/cm², modulus of elasticity in tension in cross-machine direction: 790 N/cm², interlaminar strength: 12.6 N/cm) was used instead of the black polyolefin foam (1).

Comparative Example 3

A double-sided adhesive tape having a thickness of 200 μm was obtained by the same method as in Example 1 except that a black polyolefin foam (5) (thickness: 140 μm, apparent density: 0.40 g/cm³, 25% compressive strength: 130 kPa, modulus of elasticity in tension in machine direction: 994 N/cm², modulus of elasticity in tension in cross-machine direction: 713 N/cm², interlaminar strength: 19.1 N/cm) was used instead of the black polyolefin foam (1).

Comparative Example 4

A double-sided adhesive tape having a thickness of 200 μm was obtained by the same method as in Example 1 except that a white polyolefin foam (6) (thickness: 100 μm, apparent density: 0.53 g/cm³, 25% compressive strength: 190 kPa, modulus of elasticity in tension in machine direction: 1,600 N/cm², modulus of elasticity in tension in cross-machine direction: 1,190 N/cm², interlaminar strength: 24.2 N/cm) was used instead of the black polyolefin foam (1).

Comparative Example 5

A double-sided adhesive tape having a thickness of 200 μm was obtained by the same method as in Example 4 except that a rayon non-woven fabric (basis weight: 17 g/m², tensile strength: 16.0 N/cm) was used instead of the black polyolefin foam (1) and an adhesive layer composed of the adhesive composition (A) and having a thickness of 90 μm after drying was used.

Comparative Example 6

A double-sided adhesive tape having a thickness of 200 μm was obtained by the same method as in Example 1 except that a polyethylene terephthalate (PET) film (thickness: 25 μm, the wetting index of the surfaces was adjusted to 52 mN/m by a corona treatment) was used instead of the black polyolefin foam (1) and an adhesive layer composed of the adhesive and having a thickness of 88 µm after drying was used.

For the foam bases used in Examples and Comparative Examples and the double-sided adhesive tapes obtained in Examples and Comparative Examples, the following evaluations were performed. The results are shown in tables below.

[Thicknesses of Foam Base and Adhesive Tape]

The thicknesses of the foam bases and the adhesive tapes were measured with a dial thickness gauge Model G manufactured by OZAKI MFG. Co., Ltd. Regarding the adhesive tapes, the thicknesses were measured after the release films were removed.

[Interlaminar Strength of Foam Base]

First, 1.33 parts by mass of "Coronate L-45" (isocyanate cross-linking agent, solid content: 45%) manufactured by Nippon Polyurethane Industry Co., Ltd. was added relative to 100 parts by mass of the adhesive composition (B), and the resulting mixture was stirred for 15 minutes. The mixture was then applied onto a PET film having a thickness of 75 µm, the PET film having been subjected to a release treatment, such that the thickness after drying became 50 µm. Drying was performed at 80° C. for three minutes to form an adhesive layer. Next, the adhesive layer was bonded to each surface of a foam whose interlaminar strength is to be evaluated. The foam was then laminated with the adhesive layers at 23° C. with a roll at a line pressure of 5 kgf/cm. Subsequently, aging was performed at 40° C. for 48 hours. Thus, a double-sided adhesive tape for the measurement of an interlaminar strength was obtained.

Next, one adhesive surface of the double-sided adhesive tape was lined with a polyethylene terephthalate film (whose surface to be bonded to the one adhesive surface was subjected to a corona treatment so as to have a wetting index of 52 mN/m) which had a thickness of 25 µm, thus preparing a double-sided adhesive tape sample having a width of 1 cm and a length of 10 cm (in the machine direction of the foam base). The double-sided adhesive tape sample was attached to a polyethylene terephthalate film (whose surface to be bonded to an adhesive surface was subjected to a corona treatment so as to have a wetting index of 52 mN/m) which had a thickness of 50 µm at 23° C. and at 50% RH under pressure by using a 2-kg roller so as to reciprocate once, and was allowed to stand at 60° C. for 48 hours. After the sample was allowed to stand at 23° C. for 24 hours, the sample was fixed to a test piece stage of a high-speed peel testing machine (TE-703, manufactured by Tester Sangyo Co., Ltd.) using a double-sided adhesive tape for fixing such that a surface of the polyethylene terephthalate film having a thickness of 50 µm was disposed on the test piece stage. The polyester film having a thickness of 25 µm was then pulled at 23° C. in a direction of 90 degrees at a tensile speed of 15 m/min to tear the foam (i.e., break the base). The maximum strength at this time was measured. (Unit: N/cm)

[Modulus of Elasticity in Tension]

A foam base or a double-sided adhesive tape (from which release films had been removed) was processed into a test piece having a distance between reference lines of 2 cm (in the machine direction and the cross-machine direction of the foam base) and a width of 1 cm. The test piece was pulled at a tensile speed of 300 mm/min. In this case, the strength at the time when the test piece was broken was measured.

[Tensile Elongation]

A foam base or a double-sided adhesive tape (from which release films had been removed) was processed into a test piece having a distance between reference lines of 2 cm in the machine direction of the foam base and in the cross machine direction, and a width of 1 cm. The test piece was pulled at a tensile speed of 300 mm/min. In this case, the elongation at the time when the test piece was broken was defined as a tensile elongation.

[Average Bubble Diameters of Foam Base in Machine Direction and Cross-Machine Direction]

A foam base was cut so as to have a dimension in the machine direction of about 1 cm and a dimension in the cross-machine direction of about 1 cm. A central portion of a cross section of the cut foam base was enlarged at a magnification of 200 by using a microscope (trade name "KH-7700", manufactured by HiROX Co., Ltd.). Subsequently, a photograph of a cross section in the cross-machine direction or the machine direction of the foam base was taken such that the photograph included the cross section of the foam base over the entire length of the cross section in the vertical direction of the base. In the obtained photograph, the diameters of all bubbles that were present on a cross section corresponding to an actual length of 2 mm before the magnification in the cross-machine direction or the machine direction were measured. An average bubble diameter was calculated from the average of the diameters. This measurement was conducted at 10 arbitrary positions. The average of the diameters at the 10 positions was defined as an average bubble diameter in the machine direction (MD) or an average bubble diameter in the cross-machine direction (CD).

[Average Bubble Diameter of Foam Base in Vertical Direction]

An average bubble diameter of a foam base in the vertical direction was determined as follows. Observation with a microscope was conducted under the same conditions as those of the measurement of the average bubble diameter of a foam base in the machine direction. For bubbles whose diameters in the machine direction or the cross-machine direction had been measured in the obtained photograph, the diameters of all the bubbles in the vertical direction were measured. The average bubble diameter was calculated from the average of the diameters. This measurement was conducted at 10 arbitrary positions. The average of the diameters at the 10 positions was defined as the average bubble diameter in the vertical direction (VD). In addition, the average bubble diameter in the vertical direction (VD) was determined.

[Surface Adhesive Strength]

1) Two strips of the above-prepared double-sided adhesive tape having a width of 5 mm and a length of 40 mm were attached at 23° C. to an acrylic board (ACRYLITE MR200 "Trade name", manufactured by Mitsubishi Rayon Co., Ltd., Color: transparent) that was 2 mm thickness and 50 mm square so as to be parallel to each other with a distance of 40 mm therebetween (FIG. 1).

Figure 2:
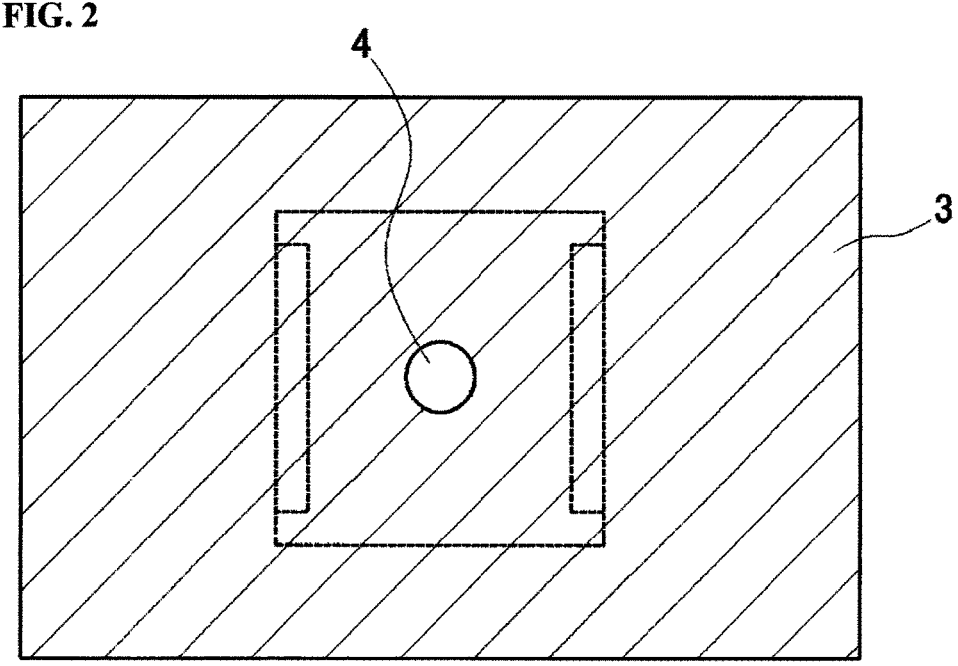
FIG. 2 is a schematic view illustrating a test piece for a surface adhesive strength, the test piece being prepared by bonding an acrylic board to an acrylonitrile-butadiene-styrene (ABS) board with strips of a double-sided adhesive tape 1 such that the acrylic board coincides with the center of a hole of the ABS board.

2) Next, the acrylic board with the double-sided adhesive tape strips prepared in 1) was attached to an ABS board (Tafuesu (SUNLOID ABS) R EAR003, manufactured by Sumitomo Bakelite Co., Ltd, Color: natural, without embossing) which had a thickness of 2 mm and a rectangular shape of 100×150 mm and in which a hole having a diameter of 10 mm was formed in a central portion thereof such that the center of the acrylic board coincided with the center of the ABS board. A pressure was applied thereto by using a 2 kg-roller so as to reciprocate once. The resulting boards were then allowed to stand at 23° C. for one hour. Thus a test piece was prepared (FIG. 2).

Figure 3:
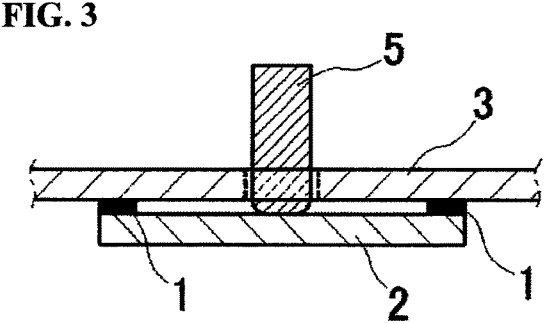
FIG. 3 is a schematic view illustrating a method for measuring a surface adhesive strength.

3) The acrylic board was pressed at a rate of 10 mm/min from the ABS side of the test piece through the hole of the ABS board by using a tensile testing machine provided with a stainless steel probe having a diameter of 8 mm. A strength at which the acrylic board was detached was measured (FIG. 3).

[Drop Impact Test]

Figure 4:
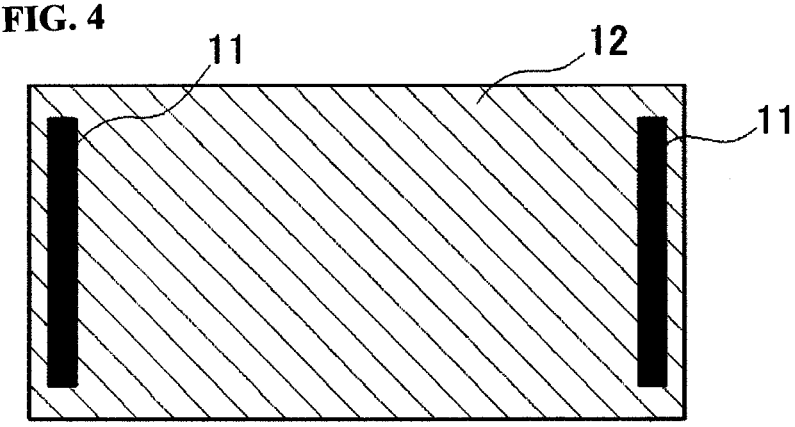
FIG. 4 is a schematic view of a test piece for a drop impact test, the test piece being viewed from a top surface.
Figure 5:
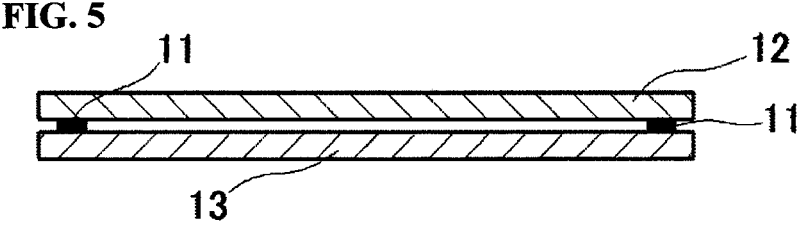
FIG. 5 is a schematic view of a test piece for a drop impact test, the test piece being viewed from a cross-sectional direction.

1) Two strips of the above-prepared double-sided adhesive tape having a width of 2 mm and a length of 20 mm were attached to an acrylic board having a thickness of 2 mm, a width of 25 mm, and a length of 50 mm so as to be parallel to each other in a width direction with a distance of 45 mm therebetween (FIG. 4). The acrylic board was then attached to another acrylic board having a thickness of 2 mm, a width of 25 mm, and a length of 50 mm. A pressure was applied thereto by using a 2 kg-roller so as to reciprocate once. The resulting acrylic boards were then allowed to stand at 23° C. for 24 hours. Thus, a test piece was prepared (FIG. 5).

Figure 6:
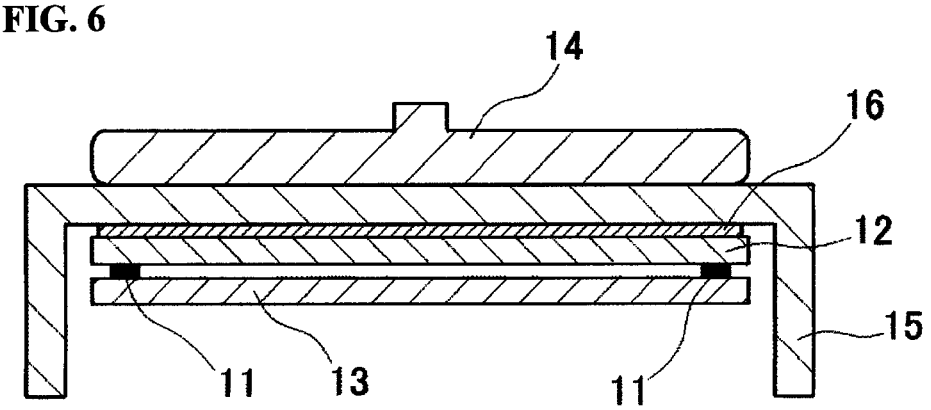
FIG. 6 is a schematic view of a state in which a test piece for a drop impact test is attached to a drop test jig, the state being viewed from a cross-sectional direction.

2) The test piece was fixed to a stainless steel dropping measuring jig including a metal weight (total mass: 300 g) with a double-sided adhesive tape for fixing, the adhesive tape having a width of 25 mm and a length of 50 mm (FIG. 6). The test piece was repeatedly dropped from a height of 60 cm (5 times at each height) to a concrete surface. Detachment and breaking of the tape in the test piece were examined.

B: Detachment and breaking of the tape did not occur.

C: Detachment or breaking of the tape occurred.

[Conformability Test]

Figure 7:
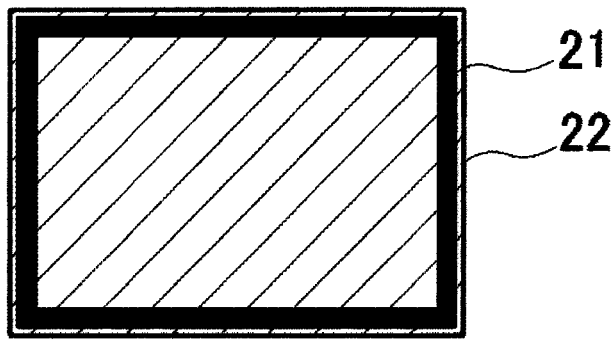
FIG. 7 is a schematic view illustrating an acrylic board having a double-sided adhesive tape and used for a conformability/waterproof test.

1) A frame-shaped sample having outer dimensions of 64 mm×43 mm and a width of 2 mm was prepared by using the double-sided adhesive tape obtained above, and attached to an acrylic board having a thickness of 2 mm and outer dimensions of 65 mm×45 mm (FIG. 7).

Figure 8:
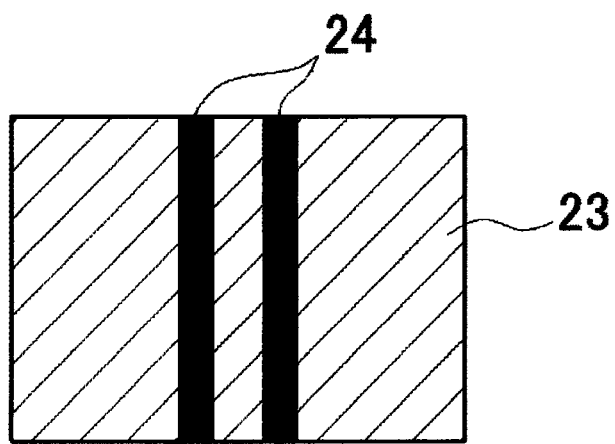
FIG. 8 is a schematic view illustrating an acrylic board having steps and used for a conformability/waterproof test.

2) Next, two strips of a single-sided adhesive tape (for forming a step) including a polyethylene terephthalate base and having a thickness of 30 μm, a width of 5 mm, and a length of 45 mm were attached to central portions of another acrylic board having a thickness of 2 mm and outer dimensions of 65 mm×45 mm so as to be parallel to each other in a lengthwise direction with a distance of 1 cm therebetween. Thus, an acrylic board having steps was prepared (FIG. 8).

Figure 9:
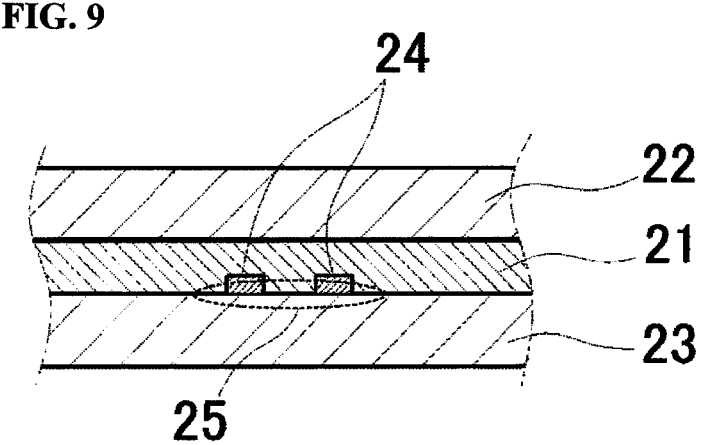
FIG. 9 is a schematic view of a state in which an acrylic board having a double-sided adhesive tape and an acrylic board having steps, the acrylic boards being used for a conformability/waterproof test, are bonded to each other, the state being viewed from a cross-sectional direction.

3) The acrylic board with the double-sided adhesive tape strips was placed at 23° C. on the adhesive tape portions of the acrylic board having the steps. A pressure was then applied thereto from an end by using a 2 kg-roller so as to reciprocate once (FIG. 9).

4) The conforming state of the double-sided adhesive tape near the steps was evaluated by visual observation from the acrylic board side, the acrylic board having the steps.

B: The double-sided adhesive tape was in close contact with the acrylic board having the steps.

C: The double-sided adhesive tape was not in close contact with the acrylic board having the steps.

[Waterproof Test]

1) A frame-shaped sample having outer dimensions of 64 mm×43 mm and a width of 2 mm was prepared by using the double-sided adhesive tape obtained above, and attached to an acrylic board having a thickness of 2 mm and outer dimensions of 65 mm×45 mm (FIG. 7).

2) Next, two strips of a single-sided adhesive tape (for forming a step) including a polyethylene terephthalate base and having a thickness of 30 μm, a width of 5 mm, and a length of 45 mm were attached to central portions of another acrylic board having a thickness of 2 mm and outer dimensions of 65 mm×45 mm so as to be parallel to each other in a lengthwise direction with a distance of 1 cm therebetween. Thus, an acrylic board having steps was prepared (FIG. 8).

3) The double-sided adhesive tape side of the acrylic board with the double-sided adhesive tape strips was placed at 23° C. on the adhesive tape portions of the acrylic board having the steps. A pressure was then applied thereto from an end by using a 2 kg-roller so as to reciprocate once. The resulting acrylic boards were allowed to stand at 23° C. for 24 hours. Thus, a test piece was prepared (FIG. 9).

4) The test piece was allowed to stand in water at a depth of 1 m for 30 minutes (in accordance with IPX7 of JIS C0920). Subsequently, occurrence or non-occurrence of entering of water in the frame of the frame-shaped double-sided adhesive tape was evaluated.

B: Entering of water did not occur.

C: Entering of water occurred.

[Reworkability]

1) A frame-shaped sample having outer dimensions of 65 mm×43 mm and a width of 2 mm was prepared by using the double-sided adhesive tape, and attached to an acrylic board (ACRYLITE MR200 "Trade name", manufactured by Mitsubishi Rayon Co., Ltd., Color: transparent, hereinafter the same) having a thickness of 2 mm and outer dimensions of 65 mm×45 mm. Next, the resulting acrylic board was attached to an ABS board (manufactured by Takiron Co., Ltd., Color: natural, without embossing, hereinafter the same) having a thickness of 2 mm and outer dimensions of 90 mm×50 mm. A pressure was applied thereto using a 2 kg-roller so as to reciprocate once. The resulting boards were then allowed to stand at 23° C. for 24 hours. Thus, a test piece was prepared.

2) The state of the tape when the acrylic board of the test piece was peeled off in the vertical direction at 23° C. was evaluated.

3) Next, the double-sided adhesive tape remaining on the ABS board or the acrylic board was peeled off by hand in a direction of a peel angle of about 135 degrees. The ease of peeling at that time was evaluated.

A: The tape could be peeled off without interlaminar cracking of the base and a residue of an adhesive.

B: The foam base was cracked between layers. However, when the remaining double-sided adhesive tape was then pulled by hand, the tape could be peeled off without a residue of an adhesive.

C: An adhesive was left on the adherend. Alternatively, the foam base was cracked between layers, and even when the remaining double-sided adhesive tape was then pulled by hand, the tape could not be peeled off.

TABLE 1

| | | Example 1 | Example 2 | Example 3 | Example 4 | Example 5 | Example 6 |
|---|---|---|---|---|---|---|---|
| Base | Type | Black polyolefin 1 | Black polyolefin 1 | Black polyolefin 1 | Black polyolefin 1 | Black polyolefin 2 | Black polyolefin 7 |
| | Thickness [μm] | 100 | 100 | 100 | 100 | 110 | 80 |
| | Apparent density [g/cm$^3$] | 0.41 | 0.41 | 0.41 | 0.41 | 0.46 | 0.48 |

TABLE 1-continued

|  |  | Example 1 | Example 2 | Example 3 | Example 4 | Example 5 | Example 6 |
|---|---|---|---|---|---|---|---|
|  | 25% compressive strength [kPa] | 190 | 190 | 190 | 190 | 270 | 350 |
|  | Interlaminar strength [N/cm] | 16.2 | 16.2 | 16.2 | 16.2 | 13.6 | 14.4 |
| Average bubble diameter [μm] | Machine direction (MD) | 121 | 121 | 121 | 121 | 94 | 106 |
|  | Cross-machine direction (CD) | 158 | 158 | 158 | 158 | 369 | 95 |
|  | Vertical direction (VD) | 25 | 25 | 25 | 25 | 31 | 35 |
| Aspect ratio | MD/VD | 4.8 | 4.8 | 4.8 | 4.8 | 3.0 | 3.0 |
|  | CD/VD | 6.3 | 6.3 | 6.3 | 6.3 | 11.9 | 2.7 |
|  | MD/CD | 0.8 | 0.8 | 0.8 | 0.8 | 0.3 | 1.1 |
| Modulus of elasticity in tension [N/cm$^2$] | MD | 964 | 964 | 964 | 964 | 1456 | 1320 |
|  | CD | 861 | 861 | 861 | 861 | 956 | 750 |
| Tensile elongation [%] | MD | 490 | 490 | 490 | 490 | 656 | 581 |
|  | CD | 299 | 299 | 299 | 299 | 304 | 402 |
| Adhesive | Type | A | B | C | A | A | A |
|  | Coating thickness [μm] | 50 | 50 | 50 | 25 | 50 | 40 |
|  | Gel fraction [%] | 48 | 37 | 40 | 48 | 48 | 48 |
| Adhesive tape | Thickness [μm] | 200 | 200 | 200 | 150 | 210 | 160 |
|  | Surface adhesive strength [N/4 cm$^2$] | 135 | 140 | 130 | 140 | 130 | 150 |
|  | Drop impact test | B | B | B | B | B | B |
|  | Step conformability test | B | B | B | B | B | B |
|  | Waterproof test | B | B | B | B | B | B |
|  | Reworkability | A | A | A | A | A | A |

TABLE 2

|  |  | Com. Ex. 1 | Com. Ex. 2 | Com. Ex. 3 | Com. Ex. 4 | Com. Ex. 5 | Com. Ex. 6 |
|---|---|---|---|---|---|---|---|
| Base | Type | Black polyolefin 3 | Black polyolefin 4 | Black polyolefin 5 | White polyolefin 6 | Non-woven fabric | PET |
|  | Thickness [μm] | 100 | 100 | 140 | 100 | Basis weight 17 g/m$^2$ | 25 |
|  | Apparent density [g/cm$^3$] | 0.33 | 0.36 | 0.40 | 0.53 | — | — |
|  | 25% compressive strength [kPa] | 70 | 103 | 130 | 190 | — | — |
|  | Interlaminar strength [N/cm] | 8.9 | 12.6 | 19.1 | 24.2 | — | — |
| Average bubble diameter (μm) | Machine direction (MD) | 189 | 126 | 147 | 209 | — | — |
|  | Cross machine direction (CD) | 189 | 143 | 174 | 230 | — | — |
|  | Vertical direction (VD) | 27 | 20 | 33 | 20 | — | — |
| Aspect ratio | MD/VD | 7.0 | 6.3 | 4.5 | 10.5 | — | — |
|  | CD/VD | 7.0 | 7.2 | 5.3 | 11.5 | — | — |
|  | MD/CD | 1.0 | 0.9 | 0.8 | 0.9 | — | — |
| Modulus of elasticity in tension [N/cm$^2$] | MD | 799 | 1084 | 994 | 1600 | — | — |
|  | CD | 627 | 790 | 713 | 1190 | — | — |
| Tensile elongation [%] | MD | 458 | 508 | 535 | 510 | — | — |
|  | CD | 254 | 224 | 344 | 190 | — | — |
| Adhesive | Type | A | A | A | A | A | A |
|  | Coating thickness [μm] | 50 | 50 | 30 | 50 | 90 | 88 |
|  | Gel fraction [%] | 48 | 48 | 47 | 47 | 48 | 48 |
| Adhesive tape | Thickness [μm] | 200 | 200 | 200 | 200 | 200 | 200 |
|  | Surface adhesive strength [N/4 cm$^2$] | 140 | 145 | 160 | 140 | 130 | 140 |
|  | Drop impact test | C | C | C | B | B | C |
|  | Step conformability test | B | B | B | C | C | C |
|  | Waterproof test | B | B | B | C | C | C |
|  | Reworkability | C | B | A | A | C | A |

Com. Ex.: Comparative Example

As shown in Examples 1 to 6 above, the adhesive tapes of the present invention have excellent drop impact resistance and excellent conformability to an adherend, and suitable reworkability. In contrast, the adhesive tapes of Comparative Examples 1 to 6 did not combine suitable drop impact resistance, conformability, and reworkability.

REFERENCE SIGNS LIST 1 double-sided adhesive tape
2 acrylic board
3 ABS board
4 hole
5 probe
11 double-sided adhesive tape
12, 13 acrylic board
14 weight
15 jig
16 double-sided adhesive tape for fixing
21 double-sided adhesive tape
22, 23 acrylic board
24 single-sided tape for forming step
25 conformability evaluation position

The invention claimed is:

1. An adhesive tape comprising:
   a polyolefin foam base; and
   an acrylic adhesive layer disposed on at least one surface of the foam base,
   wherein the foam base has a thickness of 80 μm to 120 μm, a 25% compressive strength of 180 kPa to 500 kPa, and a density of 0.4 g/cm$^3$ or more, an average bubble diameter in a vertical direction of the foam base is 23 to 40 μm, and average bubble diameters in a machine direction and a cross-machine direction of the foam base are 50 to 400 μm, and
   wherein the acrylic adhesive layer includes (i) an acrylic copolymer having 80 to 98.5% by mass of a (meth) acrylate having 1 to 12 carbon atoms and having a weight average molecular weight of 800,000 to 2,500,000, and (ii) 18.8 parts by mass to 60 parts by mass of a tackifying rosin based on 100 parts by mass of the acrylic copolymer, and wherein the adhesive layer has a temperature at which a loss tangent (tan δ) at a frequency of 1 Hz becomes a peak value is between −16° C. to 6° C.

2. The adhesive tape according to claim 1, wherein the foam base has an interlaminar strength of 13 N/cm or more.

3. The adhesive tape according to claim 1, wherein the adhesive layer has a thickness of 10 to 100 μm.

4. The adhesive tape according to claim 1, wherein the tape is suitable for fixing a component of a portable electronic device.

5. The adhesive tape according to claim 4, wherein the component of the portable electronic device is an information display device having a diagonal length of 3.5 to 16 inches, a touch panel, or a panel that protects an information display unit.

6. The adhesive tape according to claim 2, wherein the 25% compressive strength is in a range from 180 kPa to 400 kPa.

* * * * *